May 30, 1933.  K. L. HANSEN  1,912,075
DYNAMO ELECTRIC MACHINE
Filed July 3, 1931  2 Sheets-Sheet 1
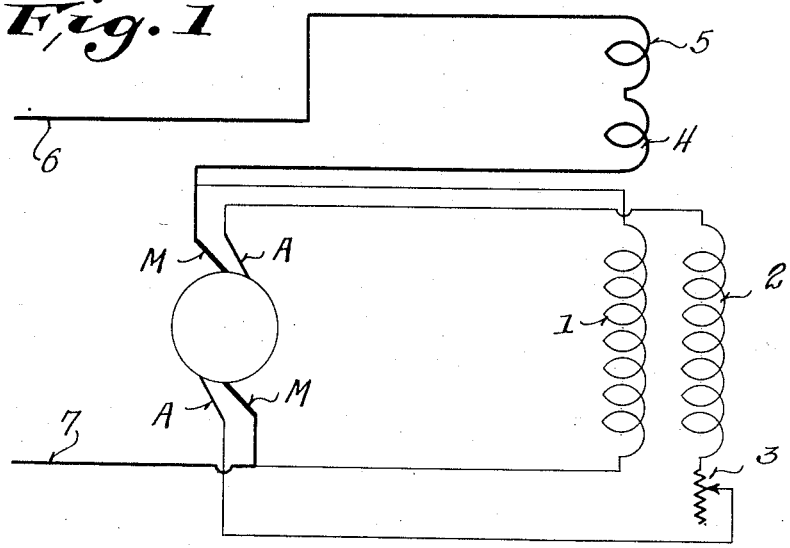
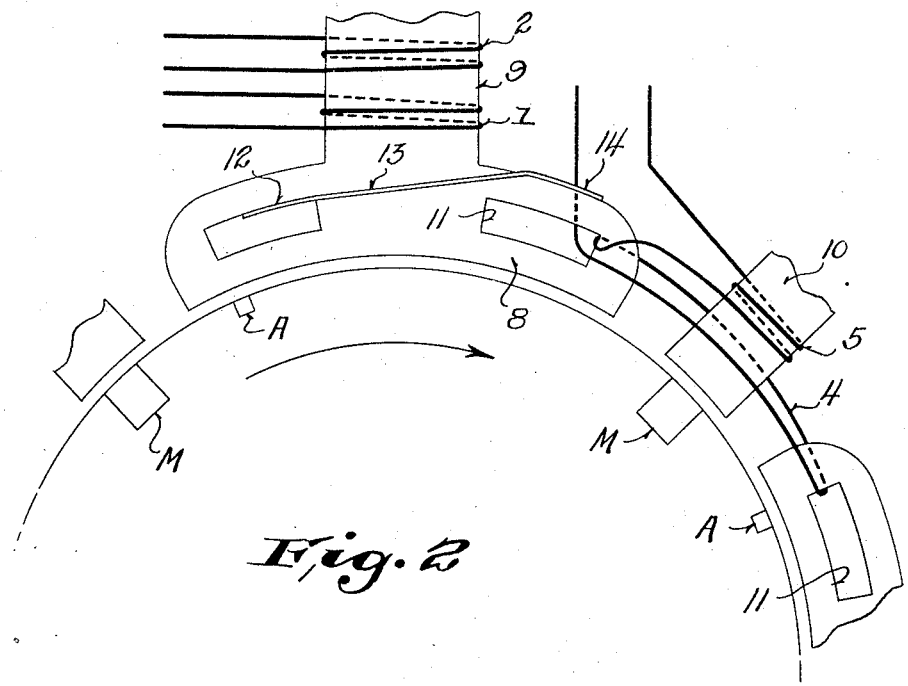
INVENTOR
Klaus L. Hansen
BY
Arthur R. Woolfolk
ATTORNEY May 30, 1933.  K. L. HANSEN  1,912,075
DYNAMO ELECTRIC MACHINE
Filed July 3, 1931   2 Sheets-Sheet 2

INVENTOR
Klaus L. Hansen
BY
Arthur R. Woolfolk
ATTORNEY

Patented May 30, 1933

1,912,075

UNITED STATES PATENT OFFICE

KLAUS L. HANSEN, OF MILWAUKEE, WISCONSIN

DYNAMO-ELECTRIC MACHINE

Application filed July 3, 1931. Serial No. 548,513.

This invention relates to dynamo electric machines.

In my prior Patents Number 1,418,707 of June 6, 1922, for constant current generator for arc welding and Number 1,711,844 of May 7, 1929, for dynamo electric machines, I disclose generators in which an auxiliary winding is provided which accentuates the reactance of the circuit, acts as a stabilizing winding, and dispenses with the necessity for an outside or auxiliary reactance.

In the latter of my above noted patents, I disclosed a dynamo electric machine, such as that used for arc welding, in which a main field is provided and a second field excited directly from the generator itself and the winding thereof supplied with current at a substantially constant voltage.

This invention embodies all of the desirable features of my above noted patents and is an improvement thereover and has for its further object the provision of means for directly interlinking the magnetic flux of the stabilizing or reactance producing winding which varies with the load, and the magnetic flux of the main poles, so that the machine instantly adapts itself to variations in the load.

In greater detail, objects of this invention are to provide a transient winding which is so related to other portions of the dynamo electric machine that, on the one hand, when current in the main or load circuit is increasing, the current in the transient winding is such as to oppose the main field flux and reduce it; and, on the other hand, when the current in the main circuit is decreasing, the current in the transient winding is such as to aid the main flux. This invention, therefore, greatly reduces overshooting in either direction. In other words, a dynamo electric machine constructed in accordance with this invention has a relatively lower peak current value, in either direction, for a given final current value for any of the rapidly varying conditions of operation.

Further objects are to provide a unitary construction of dynamo electric machine which embodies within itself, without the use of auxiliary apparatus, all of the above described features, which has a transient winding built as a portion of the machine itself which directly acts upon the main flux and has a powerful effect proportional to the rate of change of current in the main circuit, and in which the transient winding carries no current except during the periods when the current in the main circuit is actually changing thereby reducing losses.

Further objects are to provide a dynamo electric machine having the above enumerated characteristics, which has a low loss or high efficiency, which is instantly responsive, and which is of very simple eand easily produced construction.

Embodiments of the invention are shown in the accompanying drawings, in which:—

Figure 1 is a diagram of the connections and circuits employed in the machine, the transient winding being omitted.

Figure 2 is a schematic view of a portion of the machine showing the windings thereon.

Figure 3:
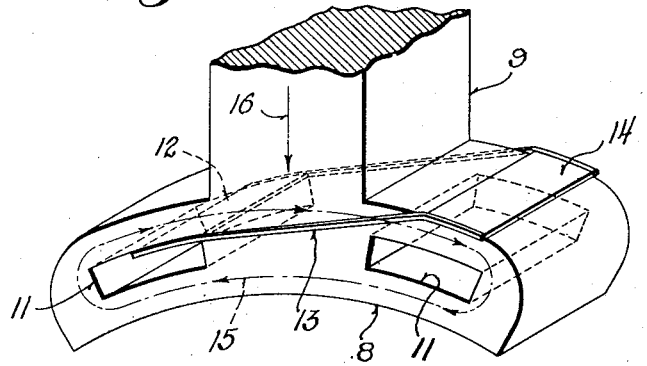
Figure 3 is a fragmentary perspective view of one of the poles of the machine with all the windings except the transient winding omitted.

Referring to Figures 1 and 2, it will be seen that the machine is provided with a pair of main brushes M and a pair of auxiliary brushes A. The main brushes M are connected to a shunt coil 1, and the auxiliary brushes A are connected to an auxiliary exciting coil 2 which will hereinafter be referred to as the auxiliary winding. The auxiliary winding is preferably provided with a variable resistance 3 in series therewith, and the shunt winding 1 may be similarly provided, if desired.

The main circuits for the generator includes, in series with the armature, a reactance increasing winding 4, which will hereinafter be referred to as the reactance winding, and an interpole or commutating winding 5. These windings are connected, as stated, in series with the armature and in series with the conductors or load circuits 6 and 7 extending from the machine and leading to the welding electrodes. The mechanical construction of the machine includes a plurality of pole pieces having elongated shoes 8, as shown in Figure 2, and relatively smaller necks 9.

Further, commutating poles or interpoles 10 are provided upon which the windings 5 are placed. It is to be noted also that the poles or pole shoes are provided with apertures 11 adjacent their ends through which the reactance winding 4 is threaded. It is preferable to form these apertures in the pole shoes themselves to secure a large value for the reactance, and also to secure a pronounced effect upon the distribution of flux in the pole shoes. The construction is somewhat similar to that described and illustrated in my earlier patent, and is quite similar to my later patent noted above.

Correct commutation can be secured by using a relatively high number of bars, so that the voltage between adjacent commutator bars is reduced to a relatively low value. The main brushes M are located in proper relation to the commutating poles 10 to secure correct commutation without sparking at the commutating bars. This, of course, is secured by having substantially zero potential between the effective conductors short circuited by the main brushes, and is readily attained by proportioning and properly designing the commutating poles.

Further, it is to be noted that the reactance winding 4 encloses the commutating poles and increases their strength, so that the commutating windings may have fewer turns. The effect of the reactance winding is to greatly increase the reactance of the main circuit, and as a secondary effect, to enhance the action of the commutating poles, so that the commutating windings need be of a lesser number of turns.

It is to be noted particularly that the auxiliary brushes A are not detrimental to the correct commutation of the machine, but work without sparking and without short circuiting any adjacent commutator bars having a material difference of potential between them.

As described in considerable detail in my later patent noted above, the auxiliary winding 2 has a substantially constant current acting like a separately excited winding, the shunt winding 1 acts in its usual capacity, and the reactance winding 4 and interpole winding 5 are in series with the load circuit and act as stabilizing windings, or reactance increasing windings, the reactance winding 4 having a pronounced effect upon the distribution of flux in the pole shoes.

This construction of dynamo electric machine secures the desirable drooping external characteristics for arc welding and other machines requiring such characteristics.

However, it has been found that arc welding dynamos or similar machines overshoot. For instance, as a specific example, suppose the machine were suddenly changed from open circuit to a condition requiring 250 amperes final state. With former types of machines the current would overshoot, possibly to 400 amperes before it arrived at its final state, as shown in the dotted line curve, Figure 5. On the other hand, suppose the conditions of the external or load circuit, which had been carrying 250 amperes, should change so that only 200 amperes were required. Before this final value was reached, the current would overshoot, possibly dropping to 150 amperes temporarily as shown in the lower loop of the dotted line curve D, Figure 5.

This invention is directed to the marked lessening of this overshooting, without the use of auxiliary apparatus and substantially without loss of efficiency, as will appear as the description proceeds.

Figure 5:
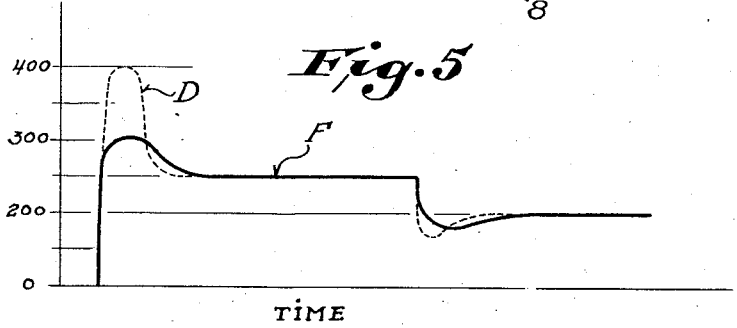
Figure 5 is a view showing in full lines a time-current curve for the machine, and showing in dotted lines a similar curve for another type of machine.

The full line curve F, Figure 5, shows the time-current curve for the machine forming the subject matter of this invention, for the conditions enumerated immediately above for the dotted line curve D. It will be seen that the current arrives at the required value in a smooth manner with scarcely any overshooting, or humps or depressions in its time-current curve, thereby producing a more stable operation, practically instantly responsive to variations in load conditions.

In order to secure the results indicated by the full line curve F of Figure 5, a transient winding has been added to each pole of the machine. For example, as shown in Figure 3, the transient winding consists of a flat metal conductor 12 located in the upper portion of one of the apertures 11 and joined by side conductors 13 to a flat metal conductor 14 located above the opposite side of the pole shoe 8. It is obvious that any shape of conductor could be used, although the flat conductors have been found highly satisfactory as they do not mechanically interfere with the other windings.

From reference to the schematic showings in Figures 1 and 2, it is apparent that the winding 4 produces a flux located within the pole piece or pole shoe 8. This flux is indicated by the reference character 15 in Figure 3. Its value varies in accordance with the current flowing in the load circuit and changes as the conditions in the load circuit change. The flux produced by the windings 1 and 2 is indicated by the reference character 16 in Figure 3.

It will be noted from Figure 3 that the transient winding interlinks with both fluxes, that is to say, it interlinks with the flux produced by the load current and that produced by the windings 1 and 2, or in other words, with the flux varying in accordance with the load conditions and with the main pole flux. It is obvious, therefore, that whenever the flux 15 varies, that a transient current will be set up in the transient winding which will aid or oppose the main pole flux.

The windings are so associated that when current in the main winding is increasing, that the current in the transient winding is such as to oppose the main flux and help to reduce it, and on the other hand, when the current in the main circuit is decreasing, the current in the transient winding is such as to assist the main pole flux and help to sustain it. The transient winding has a very powerful effect proportional to the rate of change of current in the main circuit. It has no permanent effect after a temporarily stable condition has been obtained in the load circuit. Consequently, there is no current flowing in the transient winding under these conditions. The current flows in this winding only when there is a changing current in the load circuit, or in other words, in the stabilizing winding 4.

The result of this is that the current delivered by the machine cannot overshoot in either direction. As shown by the full line curve F in Figure 5, the current is prevented from rising or falling way beyond its final value, but instead rises or falls in a more gradual manner, though with the utmost rapidity, to its final value.

When it is considered that in arc welding and similar types of electrical work that the load varies from instant to instant, it is at once appreciated that it is highly desirable to maintain stability for the arc. This is accomplished by the invention disclosed herewith which prevents over response to the varying load conditions, and thereby produces a most stable arc.

Figure 4:
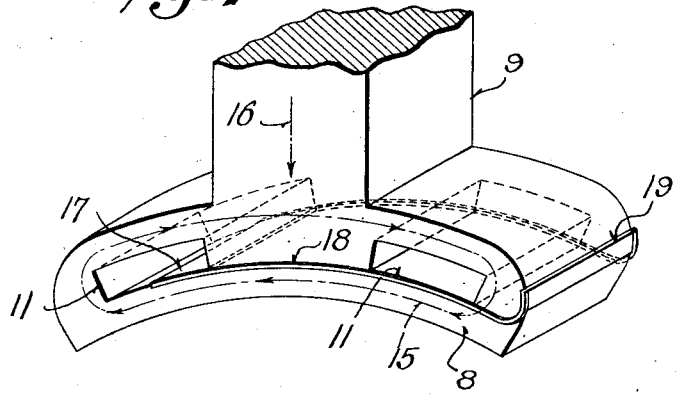
Figure 4 is a view, corresponding to Figure 3, showing a further form of the invention.

Figure 4 shows a further form of the invention which is identically similar to that disclosed in Figure 3, with the exception that the transient winding is located slightly differently with reference to the pole.

The transient winding in Figure 4 consists of the flat metal conductor 17 lying in the bottom of the aperture 11, which is joined by means of side conductors 18 with the flat metal conductor 19 lying at the opposite end of the pole shoe 8. This transient winding is also positioned so as to be out of the way of the other windings on the machine. Its operation is identically similar to that previously described in connection with Figure 3.

In this latter construction it is apparent that the main pole flux 16 and the flux 15 varying in accordance with load conditions, both interlink with the transient winding, and consequently the current flowing in the transient winding is proportional to the rate of change of the load current and opposes or aids the main pole flux in identically the same manner as that described in connection with Figure 3.

It will be seen that all of the desirable characteristics obtained by my prior inventions as disclosed in my above noted patents are retained in the machine forming the subject matter of this invention. However, additional stability and avoidance of overshooting, together with substantially instantaneously automatic adjustment to load conditions is obtained by this invention.

Further, it will be seen that although the action of the dynamo electric machine is materially altered by this invention, that nevertheless the actual physical change, namely, the positioning of the transient winding on each of the poles, may be secured with the utmost ease and with the minimum of expense.

Although this invention has been described in considerable detail, it is to be understood that such description is intended as illustrative rather than limiting, as the invention may be variously embodied and is to be interpreted as claimed.

I claim:

1. In a dynamo electric machine, an armature, a field structure having field poles provided with windings for producing a main magnetic flux and having a reactance winding for producing a magnetic flux responsive to load variations, and a winding interlinking both fluxes.

2. In a dynamo electric machine, an armature, a field structure having field poles provided with windings for producing a main magnetic flux and having a reactance winding for producing a magnetic flux responsive to load variations, and a transient winding interlinking both fluxes, said transient winding having current therein only when the current in said reactance winding is varying.

3. A dynamo electric machine having an armature, a field structure having field poles having windings for producing a main magnetic flux, a reactance winding for producing a magnetic flux responsive to load variations, and a transient winding inductively related to said reactance winding and opposing said main flux when said load is increasing and aiding said main flux when said load is decreasing, all of said windings forming a unitary structure with the field structure of said dynamo electric machine.

4. A dynamo electric machine comprising a field structure having field poles, an armature, a field winding, a reactance winding having a magnetic circuit including a portion of said field poles and responsive to load variations, and a transient winding carried by said field poles and interlinking the fluxes produced by both the field winding and the reactance winding.

5. A dynamo electric machine comprising a field structure having field poles, an armature, field windings on said field poles, a reactance winding responsive to variations in the load current, said reactance winding having its magnetic circuit including a portion of said field poles and acting to distort the flux from said field poles, and a transient winding through which the flux from said field poles pass, said transient winding being inductively coupled to said reactance winding.

6. A dynamo electric machine comprising a field structure having field poles provided with necks and pole shoes, said pole shoes having apertures therethrough, an armature, field windings on the necks of said field poles, a reactance winding threaded through the apertures in said pole shoes, and a transient winding interlinking the flux produced by both said field windings and said reactance winding.

7. A dynamo electric machine comprising a field structure having field poles provided with necks and pole shoes, said pole shoes having apertures therethrough, an armature, field windings on the necks of said field poles, a reactance winding threaded through the apertures in said pole shoes, and a transient winding carried by each field pole and interlinking the flux produced by both said field windings and said reactance winding.

8. A dynamo electric machine comprising a field structure having field poles provided with necks and pole shoes, said pole shoes having apertures therethrough, an armature, field windings on the necks of said field poles, a reactance winding threaded through the apertures in said pole shoes, and a transient winding interlinking the flux produced by both said field windings and said reactance winding, said transient winding having a portion thereof passing through an aperture in a pole shoe and having another portion thereof effectively encircling the field pole corresponding to such pole shoe.

In testimony whereof, the signature of the inventor is affixed hereto.

KLAUS L. HANSEN.